No. 1,512. REISSUED JULY 14, 1863.

J. J. SHERMAN.

CAR AND TRUCK CONNECTION.

Witnesses:
J. Coombs
A. R. Hayes

Inventor:
J. J. Sherman
per Munn & Co
Attorneys

UNITED STATES PATENT OFFICE.

JOSIAH J. SHERMAN, OF ALBANY, NEW YORK.

IMPROVEMENT IN CAR AND TRUCK CONNECTIONS.

Specification forming part of Letters Patent No. 38,182, dated April 14, 1863; Reissue No. 1,512, dated July 14, 1863.

*To all whom it may concern:*

Be it known that I, J. J. SHERMAN, of Albany, in the county of Albany and State of New York, have invented a new and useful Improvement in Car and Truck Connections for Railroad-Cars; and I do hereby declare that the following is a full, clear, and exact description of the same, reference being had to the accompanying drawings, making part of this specification, in which—

Figure 1:
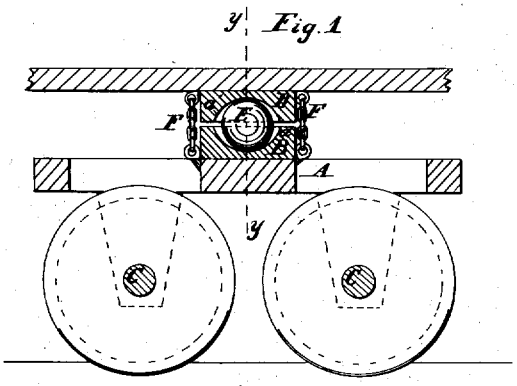
Figure 2:
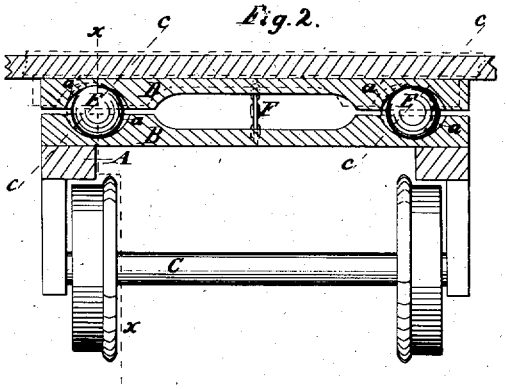
Figure 3:
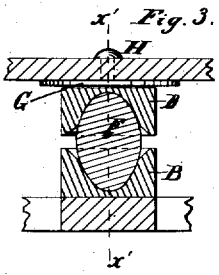
Figure 4:
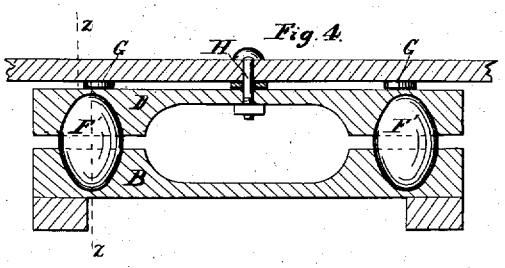

Figure 1 is a longitudinal vertical section of a car-truck with my improvement attached, taken in the line *x x*, Fig. 2. Fig. 2 is a transverse vertical section of the same, taken in the line *y y*, Fig. 1. Fig 3 is a section of a truck, showing a modification of my invention, taken in the line *z z*, Fig. 4. Fig. 4 is a section of Fig. 3, taken in the line *x' x'*. Figs. 5, 6, 7, 8, and 9 are sections of modifications of my invention detached from the truck.

Similar letters of reference indicate corresponding parts in the several figures.

The object of this invention is to diminish the lateral force upon the rails of a railroad and the wheels of a car-truck of the strains and concussions caused by the lateral movements of the car, to ease the motions of the car and to facilitate the required changes in the relative position of the trucks of a car in turning or passing over curves.

To enable those skilled in the art to fully understand and construct my invention, I will proceed to describe it.

A, Figs. 1 and 2, represents a car-truck, which may be constructed in the usual or any proper way, and B is an iron cross-piece secured to the truck transversely, half-way between and parallel with the axles C C. The cross-piece B has enlarged ends, which are converted into boxes by sinking in the center of each, on their upper sides, a smooth cavity, *a*, which in the present instance is a segment of a hollow sphere—say five and one half inches deep at the center and fourteen and one-half inches in diameter at the surface.

D is a cross-piece, which is precisely similar to B, and is secured transversely to the bottom of the car in such position that when the trucks and the car are in place the four cavities *a* of the cross-pieces B of the two trucks will coincide with the four cavities *a'* of the cross-pieces D D, and the cavities *a a'* form four inclosures directly over or a little within, as may be desired, the rails of the road, and midway between the axles of their respective trucks. Within each of these inclosures there is placed a smooth cast-iron ball, E—say eleven and one-half inches in diameter, or of a diameter exceeding the space between the top and bottom of the inclosures just sufficiently to prevent the top and bottom boxes from touching each other during any required movement of the trucks, as in passing over joints or other irregularities of the road. To diminish their weight these balls may be made hollow, and in ordinary cases, with good iron, need not exceed an inch in thickness of shell; and for the same reason such parts of the boxes as will safely admit of it may be made hollow; or, (as will be presently seen,) as it is not in all cases indispensable that they be formed upon cross pieces, they may be otherwise lightened by any desired change of design in their exterior form or manner of adjustment upon the car and trucks not incompatible with their purposes, as hereinafter explained.

To prevent the escape of the balls E from their inclosures in case of any extraordinary accident, each pair of cross-pieces or the car and the trucks may be confined together by two or more loose chains, F, so adjusted as not to permit the boxes to separate sufficiently for the balls to pass, and yet not to interfere with their action within the proper limits.

To illustrate the operation of my improvement, let the balls E in Fig. 2 be supposed to represent the position of each of the four balls, and the boxes of said balls the position of the boxes of the other balls when the car is at rest or unaffected by any lateral or other horizontal movement. Let the red outlines in Fig. 2 show their position at the instant of equilibrio after the maximum effect of a powerful horizontal impulse from the right upon the car, and *c* the line of incidence between the car and the truck, and by consequence also between the car and the rails.

It will be seen that to drive the balls to the position represented in red outlines in Fig. 2 the car must have been moved with a lateral impulse of sufficient force to overcome the threefold resistance of, first, the initial inertia of the car; second, the series of inertias presented to the series of directions in which the balls react upon the car; and, third, the superadded weight of the car, which has been lifted bodily the height indicated by the two spaces between the ball and the top and bottom of its inclosure. It is obvious that the force of this impulse, instead of being met upon the rails, the wheels, or the trucks in a horizontal direction, has, by the intervention of the balls, been first received at the perpendicular line of incidence *x* of Fig. 2, and thence progressed to the oblique one *c*, which is the nearest approach it has been allowed to make to a direct horizontal action.

It is also obvious that in whatever direction a horizontal impulse to the car may occur, and whether slight or violent, its motion will be eased by the graduated action of the balls, and that the movement of the balls being free and comparatively without friction, the trucks will turn readily to their proper positions in passing over the curves of the road.

It will also be seen that the action of the balls is particularly advantageous under the centrifugal force generated by the velocity of the cars over curves. It is well known that this force gives the cars a tendency to crowd upon the outer rail, which is in practice aimed to be counteracted by elevating that rail; but as this remedy is, by necessity, a fixed one, and consequently perfect only in velocities exactly coinciding with the fixed adjustment of the rail, it is obvious that a variable elevation of the car, depending constantly for its degree upon the degree of centrifugal force, will meet this defect, and that this defect is not only met by the action of the balls, above explained, but that the friction, retardation, and other evils of a lateral pressure of the flanges of the wheels upon the rails are diminished, if not entirely avoided, by the downward direction of the lines of incidence through which the force is resisted.

Figure 7:
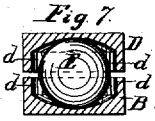

Although I consider a ball of about eleven and one-half inches diameter, with cavities of the boxes segments of a sphere about one-fourth larger, as suitable dimensions for use upon the largest class freight or passenger cars, going at moderate velocities, (and the higher the velocity the less should be the play of the ball,) yet I do not mean to confine myself to these or to any particular proportions between the size of the ball and the curves of the cavities, provided the latter are large enough to allow a movement of the ball; and in cases where there is little occasion to provide against the force of centrifugal or other horizontal action the forms of the cavities may be modified by adopting any larger curve which may be preferred, and limiting the play of the ball by terminating the curves, substantially as represented in Fig. 7, by the perpendicular sides *d*. Nor do I mean to confine myself to a spherical form for these curves, as any oval or other curvilinear, or even a V-shaped figure may be used with more or less advantage, according to the circumstances of each particular case.

Figure 5:
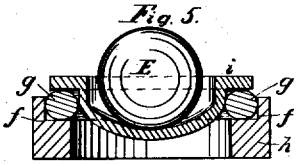
Figure 6:
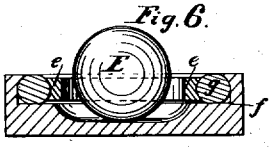
Figure 9:
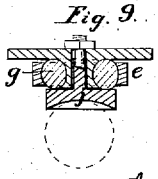

Although my invention is not intended, in the cases above described or referred to, to supersede the use of springs, which may be used as usual, yet it admits of modifications by which they may be combined with it to act either as substitutes for or auxiliary to others, as shown in Figs. 5, 6, and 9.

In Fig. 6, *e* is an iron collar surrounding the ball E, with sufficient space between them to allow the desired play of the ball, and *f f* a surrounding recess in the cavity, to be compactly filled with a ring of vulcanized rubber, *g*, upon which the collar presses. The collar should project a little within the recess to prevent its displacement, which is also further guarded against, and that of the rubber also, by the curved sides of both the collar and the recess. In Fig. 5, *f f* is the surrounding recess for the rubber *g*. *h* is a circular frame in which it is formed, and which is secured to the truck, and *i* is a surrounding projection of the top of the box, the form of which is changed, substantially as shown.

It will be seen that by allowing a suitable space between the box and the frame for play to the box both a downward and horizontal spring is afforded to the car. In these cases, Figs. 5 and 6, it is not indispensable that the upper boxes or those attached to the car should be provided with the springs, yet they may be so, if preferred.

Figure 8:
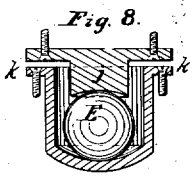

Fig. 8 represents a modification in which a projecting cylinder, *j*, with the proper concavity formed in its lower end, is substituted for the upper box before described. In this case the bottom cavity is formed in the box *m*, which is designed to be suspended from the truck by means of the flanges *k k*. This cylinder *j* projects into the box, which is made deep for the purpose, sufficiently to have its horizontal movements properly limited by the sides of the box. In proportioning its diameter to that of the cavity of the box it should be borne in mind that when the ball moves one inch horizontally the cylinder moves two inches and in that ratio.

As shown in Fig. 9, the rubber spring *g* and collar *e* may be used upon the cylinder by reversing the order of arrangement shown in Fig. 6. In this case, as the interior diameter of the lower side of the collar should be smaller than the diameter of the cylinder, the latter should be made in two parts, as shown in Fig. 9, to admit the collar to its place.

In the cases heretofore described or referred to the use of iron or other metallic or unyielding substance for the balls E has been supposed; but I do not mean to confine myself to these or in all cases to the use of the balls themselves, as one or more of the objects of the invention may be attained and a modified action of the boxes, which in some cases may be preferred, obtained by substituting a semi-elastic substance for metal in the balls or an elastic substance—as vulcanized rubber—for the balls themselves. If vulcanized rubber is used, boxes with cavities substantially like those of Fig. 1, 2, and 7 should be employed, and a conical form substituted for spherical, as shown in Fig. 3 and 4, at F′, in order to steady the rubber. The rubber F′ should be fitted to fill the cavities compactly, (except in some cases in a longitudinal direction, as presently explained,) so as to substitute the atomic mobility of the rubber for the bodily mobility of the balls. The edges of the cavities should be rounded to prevent cutting the rubber, and the perpendicular thickness of the rubber adjusted to the depth of the cavities in such a manner as to keep the upper and lower boxes sufficiently apart to allow the required play between them under all degrees of compression to which the rubber will be subjected. These rubbers F′ may be strengthened to any required degree by forming them upon an iron or other metallic core, elongated, like themselves, perpendicularly. (In like manner the balls E may be coated with rubber, if desired.)

It is obvious that in this modification of the invention, all relative movement of the car and the trucks being, as before, qualified by the peculiar restraints interposed by the boxes, and the mobility of the particles of the rubber supplying the place of the mobility of the ball, part of the advantages attributed to the action of the balls are obtained, with the additional one of an universal spring to the car, or one acting in all directions.

The circular movement of the truck upon its axis in turning large curves of the road is so slight that very little longitudinal play of the balls or of the boxes to respond to it is needed. For instance, on a curve of one thousand feet radius, with the trucks of the car fifty feet apart from center to center, and the vertical centers of the two inclosures of each truck four feet apart, the longitudinal movement of a bottom box forward or backward of its top box would not exceed six-tenths of an inch, and as but half this movement is made by the ball it is not required to depart from the center of either cavity more than three-tenths of an inch—a space so inappreciable in the proportions between the balls and their inclosures, or the dimensions of the cavities I have proposed, as to require no special provision for it.

In cases where much smaller curves of the road are to be provided for, and increased play in that direction given to the balls, the bottoms of the cavities must be elongated by flattening their curves longitudinally; or the cavities themselves may be made oblong.

Where elastic rubber is used in place of the balls, instead of elongating either the bottom or the whole of the cavity for this purpose, an outer portion only should be elongated, say, to a depth of from one-fourth to one-third that of the cavity, and with a taper to the interior line where the elongation commences, as shown in Fig. 3. The rubber should not fill this added space compactly, except when forced into it by the action of the truck in turning curves; but as it is not desirable to allow much longitudinal play to the balls or to the boxes, and as it will be necessary in some cases to provide for sharp curves in the road, the upper cross-pieces, D, should in such cases be used and attached to the car by means of a key-bolt, H, in the center, as shown clearly in Fig. 4, and turn upon slides G, substantially in the manner the trucks themselves ordinarily turn. These slides should be curved inwardly and be segments of a circle of which their distances from the center of the key-bolt is the radius, and care should be taken that they are of such length as not to be overreached by the movements of the cross-piece, but that they shall afford a full-width bearing to their boxes in all positions they may take in turning curves. This arrangement, it will be seen, does not interfere with the distinctive action of the boxes, but operates entirely through their medium, and serves only to extend its range.

I am aware that car-bodies have before been supported upon their trucks through the medium of metallic balls or convex plates, so as to permit lateral or oscillating motion, as described in Letters Patent granted to Thomas P. How on the 11th of March, 1851, and to Thomas E. Roberts on the 16th of August, 1859. The first-named device is essentially different from mine, inasmuch as the bearings are not so constructed as to restore the car-body to its normal position by their own automatic action. Roberts's invention is inferior to mine, in providing for a rocking rather than a direct lateral motion and requiring accurate balancing to secure its full efficiency.

Having thus described my invention, what I claim as new, and desire to secure by Letters Patent, is—

1. The employment or use of balls E or rubbers F′ interposed between the trucks and the car-body in suitable boxes, when said parts are so constructed and combined as to permit free motion to the car-body horizontally in either direction and afterward restore it automatically to its normal position, substantially as herein described.

2. The combination of the annular springs *g* with the bearings *e f h i j*, or any of them, or the mechanical equivalent of said springs, when used in connection with the balls E or rubbers F′ to restrain or qualify their action, substantially in the manner herein set forth.

JOSIAH J. SHERMAN.

Witnesses:
PAUL F. COOPER,
WILLIAM LANSING.